United States Patent
Schumann et al.

(10) Patent No.: US 9,368,839 B2
(45) Date of Patent: Jun. 14, 2016

(54) BATTERY HAVING A DEVICE FOR INTRODUCING REPLENISHING ELECTROLYTE INTO THE BATTERY

(75) Inventors: Bernd Schumann, Rutesheim (DE); Niluefer Baba, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1158 days.

(21) Appl. No.: 12/998,683

(22) PCT Filed: Sep. 14, 2009

(86) PCT No.: PCT/EP2009/061852
§ 371 (c)(1),
(2), (4) Date: Jul. 5, 2011

(87) PCT Pub. No.: WO2010/057696
PCT Pub. Date: May 27, 2010

(65) Prior Publication Data
US 2011/0256429 A1    Oct. 20, 2011

(30) Foreign Application Priority Data

Nov. 18, 2008 (DE) .......................... 10 2008 043 808

(51) Int. Cl.
*H01M 10/42* (2006.01)
*H01M 2/36* (2006.01)
*H01M 10/0525* (2010.01)
*H01M 10/06* (2006.01)
*H01M 10/34* (2006.01)

(52) U.S. Cl.
CPC .......... *H01M 10/4242* (2013.01); *H01M 2/362* (2013.01); *H01M 10/0525* (2013.01); *H01M 10/06* (2013.01); *H01M 10/34* (2013.01); *Y02T 10/7011* (2013.01); *Y02T 10/7016* (2013.01)

(58) Field of Classification Search
CPC ..................... H01M 10/4242; H01M 10/0525; H01M 10/06; H01M 10/34; H01M 2/362; Y02T 10/7011; Y02T 10/7016
See application file for complete search history.

(56) References Cited

U.S. PATENT DOCUMENTS

| 3,536,536 | A | * | 10/1970 | Lucas | ............................. 429/55 |
| 3,684,581 | A |   | 8/1972  | Jufer |   |
| 3,740,272 | A |   | 6/1973  | Blaich et al. |   |
| 4,004,068 | A |   | 1/1977  | Briggs et al. |   |
| 4,477,540 | A | * | 10/1984 | Miller et al. | .................. 429/402 |
| 4,522,896 | A | * | 6/1985  | Iseard | ............................. 429/63 |
| 7,704,637 | B2 | * | 4/2010 | Yan et al. | ...................... 429/163 |
| 2005/0106456 | A1 | * | 5/2005 | Puester et al. | ................. 429/185 |

(Continued)

FOREIGN PATENT DOCUMENTS

| DE | 6907134 U | 10/1969 |
| DE | 2003968 A1 | 8/1971 |

(Continued)

*Primary Examiner* — Raymond Alejandro
(74) *Attorney, Agent, or Firm* — Maginot, Moore & Beck LLP

(57) ABSTRACT

A battery includes a cathode, an anode, and a separating component interposed therebetween. The cathode, anode, and separating component are received within a housing of the battery which also contains at least one electrolyte. The battery also includes at least one electrolyte contained within the housing, and at least one device configured to dissipate and/or collect gases or vapors from the battery. The battery also includes at least one device configured to introduce at least one replenishing electrolyte into the battery.

15 Claims, 2 Drawing Sheets

(56) References Cited

U.S. PATENT DOCUMENTS

2006/0240317 A1 10/2006 Phillips et al.
2009/0123833 A1 5/2009 Mao et al.

FOREIGN PATENT DOCUMENTS

| DE | 102005004843 A1 | 8/2006 |
| WO | 2007118358 A1 | 10/2007 |

* cited by examiner

BATTERY HAVING A DEVICE FOR INTRODUCING REPLENISHING ELECTROLYTE INTO THE BATTERY

CROSS-REFERENCE TO RELATED APPLICATION

This application is a 35 USC 371 application of PCT/EP 2009/061852 filed on Sep. 14, 2009.

BACKGROUND OF THE INVENTION

1. Field of the Invention

The present invention relates to a battery, a battery module, and a method for operating at least one battery.

2. Description of the Prior Art

Batteries, such as lithium-ion batteries, supply various apparatuses, such as motor vehicles, hospitals, or power drills, with electrical current. In general, a plurality of batteries is combined in a housing of a battery module to make a larger arrangement of batteries. Battery modules have the advantage that they can be more easily cooled with a coolant, and higher levels of electrical power can be made available by the combination of a plurality of batteries to make a battery module.

In the batteries, both electrodes and at least one electrolyte are present. By means of chemical processes in the battery, the battery can make electrical current available, and conversely can be recharged by means of electrical current. In the course of operation of a battery, the material of which the electrodes are comprised and the electrolyte or electrolyte substance are often exhausted irreversibly by various oxidation reactions or other reactions, producing gas. Among other things, these processes are responsible for irreversible aging of the battery, with the consequence of a greatly shortened life of the battery.

SUMMARY OF THE INVENTION

A battery according to the invention includes a housing for receiving at least one electrolyte, at least one electrolyte received by the housing, and preferably at least one device for carrying away and/or collecting gases or vapors from the battery, and the battery is provided with at least one device for replenishing the at least one electrolyte. Thus the at least one electrolyte can be replenished into the battery, enabling replacement of the irreversibly consumed electrolyte, and as a result the life of the battery can be lengthened substantially.

In a further feature, the at least one device has at least one supply container for the at least one electrolyte and/or has at least one dispenser for introducing the at least one electrolyte, in particular from the at least one supply container, into the battery. The electrolyte for replenishing into the battery is stored in the supply container. One supply container can be assigned to each battery, or one supply container can be assigned to a. plurality of batteries. For instance, when a plurality of batteries are disposed in one battery module, there can be one supply container in the battery module for keeping and storing the electrolyte, and from it all the batteries of the battery module can be replenished with the electrolyte.

In particular, the at least one dispenser includes a membrane.

In a further feature, the at least one dispenser includes a valve or tap.

In an additional embodiment, the introduction of the at least one electrolyte can be done by means of tearing or melting the at least one membrane.

In a further feature, the replenishing of the at least one electrolyte can be controlled with the aid of a gas quantity sensor that at least indirectly detects a gas quantity. The gas quantity sensor may for instance be a pressure sensor for detecting the pressure in a gas collection chamber, or a sensor which by means of flow measurement detects the quantity of gas or vapors that have flowed out. The gas quantity sensor detects the quantity of the gases that have flowed out of the battery or the vapors that have escaped.

Preferably, the melting of the at least one membrane is controllable by a semiconductor chip.

In a variant, the melting of the at least one membrane can be done by means of electrical energy of the battery, and/or the semiconductor chip can be supplied by means of electrical energy of the battery. The at least one membrane is electrically conductive, and through it electrical current is directed to the battery, so that because of the electrical resistance of the membrane, the membrane heats up and melts, and thus the at least one electrolyte can be introduced into the battery.

Expediently, the tearing of the at least one membrane can be done by means of an overpressure in the at least one supply container. The overpressure in the at least one supply container is generated for instance by means of a pump, such as a piston pump, or by the gases or vapors escaping from the battery under pressure.

In a further embodiment, the at least one electrolyte can be introduced into the battery from the supply container by means of at least one capillary. Because of the surface tension of the at least one electrolyte, the at least one electrolyte is thus introduced automatically from the supply container into the battery by means of the at least one capillary.

In a further feature, the battery includes at least one device for carrying away and/or collecting gases or vapors from the battery.

In particular, the device includes an overpressure valve and/or a degassing conduit and/or a gas collection chamber.

A battery module according to the invention, having a plurality of batteries, includes a housing for receiving at least one electrolyte, at least one electrolyte received by the housing, and preferably at least one device for carrying away and/or collecting gases or vapors from the batteries, and the battery module includes at least one battery described in this patent application, and/or the battery module is provided with at least one device for replenishing the at least one electrolyte into the at least one battery.

The device for replenishing the at least one electrolyte into the at least one battery can, in the battery module, be embodied analogously as in the battery. For instance, inside the battery module there can be only one supply container for the at least one electrolyte, from which the electrolyte is replenished or introduced into the batteries individually by means of supply lines. For that purpose, a corresponding dispenser is present only on each individual battery, to enable replenishing individual batteries with the electrolyte as needed. Also inside a battery module, the quantity of gases or vapors carried outside is detected individually for each individual battery by a gas quantity sensor. Based on a corresponding report from a gas quantity sensor, beyond a certain gas quantity that has escaped or a quantity of vapors, the electrolyte or electrolytes are replenished from the central supply container for the electrolytes into the appropriate battery having a lack of electrolytes.

A battery or battery cell is in particular the smallest unit for electrochemical storage of electrical energy. A plurality of batteries or battery cells can be combined into a battery module.

In a further feature, the overpressure in the at least one supply container can be generated by a piston. In a variant, the at least one supply container is disposed outside the housing or inside the housing of the battery or inside the housing of the battery module.

In a preferred feature, the battery includes a positively chargeable electrode and a negatively chargeable electrode.

In a method according to the invention for operating at least one battery, including a housing for receiving at least one electrolyte, at least one electrolyte received by the housing, and preferably at least one device for carrying away and/or collecting gases or vapors from the battery, and gases or vapors are preferably carried away from the battery by means of the at least one device, and the at least one electrolyte is replenished into the at least one battery.

In an additional variant, the at least one electrolyte is replenished into the battery from a supply container.

In a further variant, the at least one electrolyte is introduced into the battery through capillaries.

In a further feature, the replenishment of the at least one electrolyte into the battery is controlled by means of the membrane, and for the replenishment the membrane is melted or torn.

BRIEF DESCRIPTION OF THE DRAWINGS

Two exemplary embodiments of the invention will be described in further detail below in conjunction with the accompanying drawings.

DESCRIPTION OF THE PREFERRED EMBODIMENTS

Figure 1:
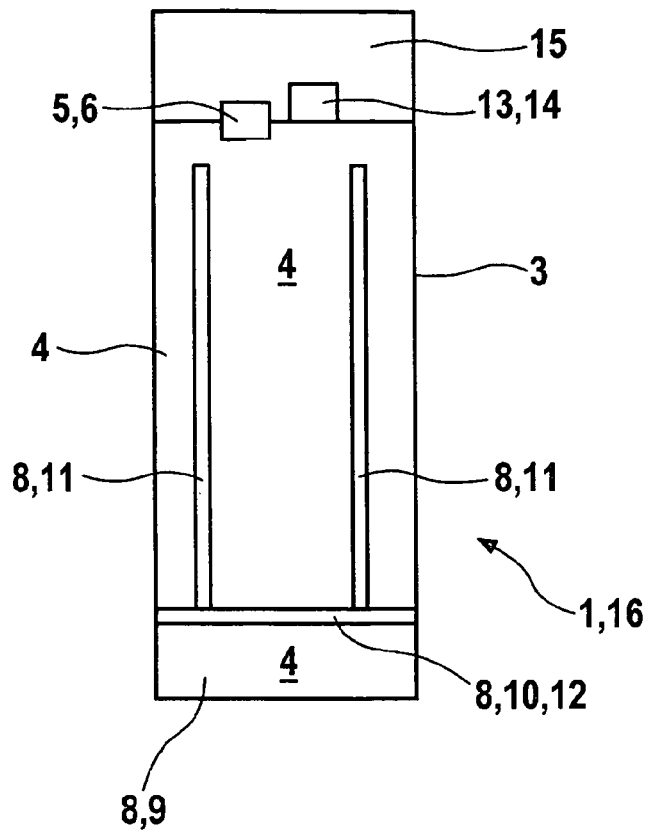
FIG. 1 shows a schematic cross section through a battery in a first embodiment.

In FIG. 1, a rechargeable battery 1, embodied as a lithium-ion battery 16, is shown. The battery 1 is used for instance for supplying hybrid motor vehicles with electrical current. A housing 3 of the battery 1 serves to receive an electrolyte 4. The electrolyte is received by a cellular material, not shown. The electrolyte 4 is a mixture of various organic substances, such as ethylene carbonate, propylene carbonate, and dimethyl carbonate. Thus a mixture of various organic electrolytes is received in the housing 3. The battery 1 further includes a positively chargeable electrode, not shown, and a negatively chargeable electrode, not shown.

The housing 3 of the battery 1 is gas- and liquid-tight, and an overpressure valve 6, as a device 5 for carrying gases or vapors away, is disposed on the upper end of the housing 3. Beyond a certain pressure inside the housing 3, the overpressure valve 6 opens and allows gases or vapors to flow out of the housing 3 into a gas collection chamber 15. The gas collection chamber 15 is disposed on an upper end of the housing 3 of the battery 1. A gas quantity sensor 14 with an integrated semiconductor chip 13 detects the quantity of gas that has flowed out of the overpressure valve 6. The gas quantity sensor 14 can be implemented in various ways. For instance, the gas quantity sensor 14 is a pressure sensor, which detects the pressure inside the gas collection chamber 15. Beyond a certain pressure inside the gas collection chamber 15, and thus beyond a certain quantity of gas that has flowed out of the housing 3 of the battery 1 through the overpressure valve 6, a critical lack of electrolyte 4 occurs in the battery 1. The gas quantity sensor 14 can also be produced in some other way than with a pressure sensor. For instance, the quantity of gas flowing out of the overpressure valve 6 can also be detected directly at the overpressure valve 6, for instance by means of a flow measurement, such as with an impeller wheel.

On a lower end of the housing 3 on the battery 1, there is a supply container 9, as a means 8 for replenishing the electrolyte 4. The electrolytes for replenishing into the battery 1 are located in the supply container 9. Capillaries 11 are stamped into the cellular material, not shown, of the battery 1 having the electrolyte. The capillaries 11 end at the supply container 9 and are separated from the supply container 9 only by a membrane 12, as the means 8 for replenishing the electrolyte 4. The semiconductor chip 13 is supplied with electrical current by means of electrical lines, not shown, from the battery 1. If the gas quantity sensor 14 has detected a predetermined critical quantity of gas that has flowed through the overpressure valve 6, the replenishment of the battery 1 with the electrolyte 4 is controlled by the semiconductor chip 13. After an appropriate signal from the gas quantity sensor 14 to the semiconductor chip 13, the pressure in the supply container 9 is raised by the semiconductor chip 13. To that end, for instance on the supply container 9, there is a piston, not shown, which in response to appropriate triggering from the semiconductor chip 13 moves and thereby increases the pressure inside the supply container 9. The pressure in the supply container 9 can also be made available, instead of by a piston, for instance by means of the gas flowing out of the battery 1 through the overpressure valve 6.

Because of this pressure increase in the supply container 9 for the electrolyte 4, the membrane 12, as a dispenser 10, tears and thus opens up the flow path between the supply container 9 and the battery 1. As a result, the electrolytes 4 can flow into the interior of the housing 3 and replace the electrolytes 4 that have been consumed because of reactions. The capillaries 11 have the effect that the electrolyte 4 from the supply container 9 is distributed quickly and uniformly in the cellular material inside the housing 3. Because of the surface tension of the electrolyte 4, the electrolyte 4 flows into the capillaries 11 counter to the force of gravity. The membrane 12 in general comprises correspondingly suitable thermoplastics. These are for instance polystyrene (PS), polyvinyl chloride (PVC), polyamide (PA), such as nylon, and acrylonitrile-butadiene-styrene (ABS).

The electrolyte 4 consumed because of various chemical reactions in the battery 1 can thus be replenished by means of the electrolyte 4 stored in the supply container 9, and thus the life of the battery 1 can be lengthened substantially. In a further exemplary embodiment, not shown, instead of one supply container 9 there are plurality of supply containers 9. When there are a plurality of supply containers 9, it is thus possible for the electrolyte 4 to be replenished from the supply container into the battery 1 multiple times. For that purpose, one dispenser 10 each, or in other words one membrane 12 each, is generally required for the supply containers 9.

Figure 2:
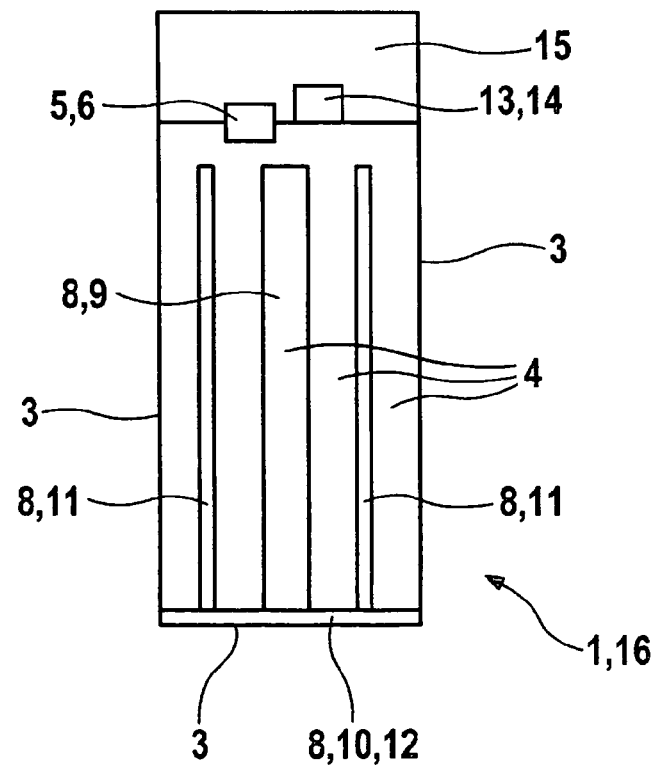
FIG. 2 shows a schematic cross section through a battery in a second embodiment.

In FIG. 2, a schematic cross section is shown through the battery 1 in a second exemplary embodiment. Below, essentially only the differences from the first exemplary embodiment of FIG. 1 will be described. The supply container 9 is disposed centrally in the interior of the battery 1. The membrane 12 closes off a lower end of the cylindrical supply container 9 and also closes off the capillaries 11. When a critical quantity of gas that has flowed through the overpressure valve 6 is detected by the gas quantity sensor 14, the membrane 12 is melted by the semiconductor chip 13, by means of electrical current from the battery 1. For that purpose, the membrane 12 is connected to the two electrodes, not shown, of the battery 1 by suitable current-carrying lines and is connected by a control circuit to the semiconductor chip 13 as well as a corresponding switch (not shown). Because of the electrical resistance of the current-conducting membrane 12, the membrane heats up and melts, so that the flow path for the electrolytes 4 from the supply container 9 to the capillaries 11 opens, so that the electrolytes 4 can flow out of the supply container 9 into the capillaries 11 and thus into the battery 1. Thus the liquid electrolyte 4 is distributed uniformly in the battery 1. As the material for the membrane 12, generally thermoplastics are used, such as low-density polyethylene (LDPE or soft PE with a melting temperature of 105 to 115° C.), or polyethylene PE-LD (melting temperature 110° C.), PE-HD (melting temperature 135° C.), PE-LLDD (melting temperature 115 to 125° C.), or plastics with a lower melting point. Otherwise, the mode of operation of the second exemplary embodiment of FIG. 2 is analogous to that of the first exemplary embodiment of FIG. 1.

Figure 3:
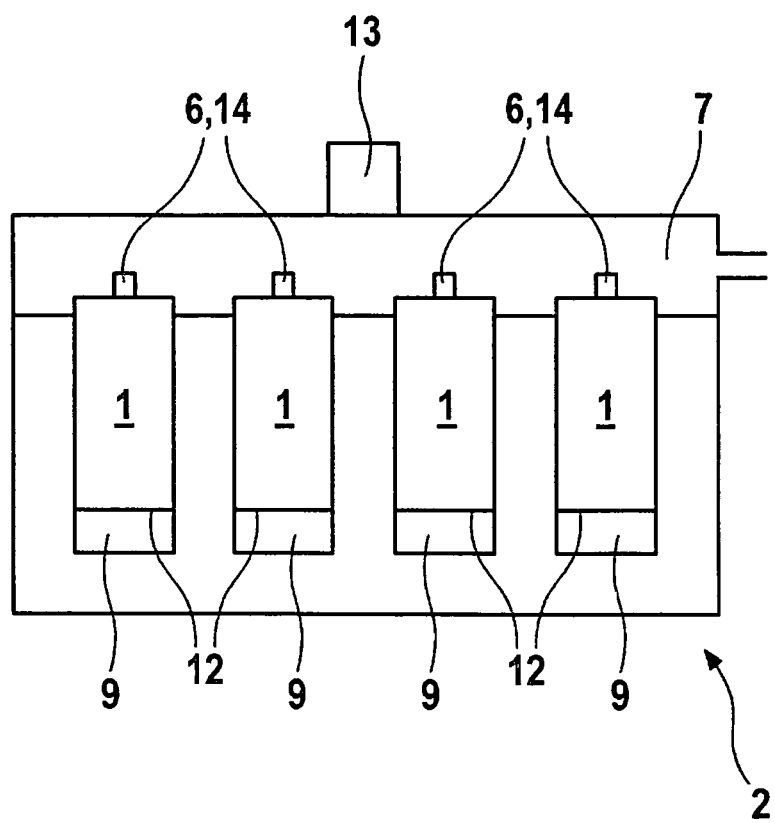
FIG. 3 shows a schematic cross section through a battery module having a plurality of batteries.

In FIG. 3, a schematic cross section through a battery module 2 with four batteries 1 is shown. The batteries 1 are each provided on the lower end with the supply container 9 for the electrolyte 4. On the. Upper end of the battery 1 there is an overpressure valve 6 with an integrated gas quantity sensor 14. If there is an overpressure inside a battery 1, the gas flows out of the battery 1 through the overpressure valve 6 into a degassing conduit 7 for all the batteries 1 of the battery module 2. The measurement data of the gas quantity sensors 14 of the batteries 1 are detected by a central semiconductor chip 13 for all the batteries 1 of the battery module 2. If a certain predetermined critical quantity of gases that have flowed out of the overpressure valve 6 is exceeded, electrolyte 4 is replenished into the battery 1 out of the supply container 9 by means of a membrane 12. This is controlled separately for the individual batteries 1 of the battery module 2 independently of one another by the central semiconductor chip 13. In a variant of the battery module 2 which is not shown, it is also possible for there to be only one central supply container 9 for all the batteries 1 of the battery module 2. By means of supply lines, not shown, the electrolyte 4 is introduced as needed individually from the central supply container 9 by means of the dispenser 10 to the appropriate battery 1 that needs electrolytes 4. As a result, in an especially advantageous way, inside a battery module 2 having only one supply container 9 for all the batteries 1 of the battery module 2, the electrolyte 4 can be replenished multiple times.

Unless noted otherwise, the details of the various exemplary embodiments can be combined with one another.

Viewed all in all, substantial advantages are associated with the battery 1 of the invention and the battery module 2 of the invention. By means of the simple replenishment of the electrolyte 4 into the battery 1, the life of batteries 1 can be lengthened markedly in a simple, economical way; as a result, the costs for the battery 1 are reduced substantially, being distributed over the entire life of the battery 1.

The foregoing relates to the preferred exemplary embodiments of the invention, it being understood that other variants and embodiments thereof are possible within the spirit and scope of the invention, the latter being defined by the appended claims.

The invention claimed is:

1. A battery having a cathode, an anode, and a separating component interposed therebetween, the battery comprising:
   a housing configured to receive the cathode, anode, and separating component of said battery and to contain electrolyte;
   at least one electrolyte contained within the housing; and
   at least one means configured to introduce at least one replenishing electrolyte into the battery, the at least one replenishing electrolyte separate from the at least one electrolyte, wherein:
   the at least one means includes at least one supply container for the at least one replenishing electrolyte and at least one dispenser configured to introduce the at least one replenishing electrolyte from the at least one supply container into the battery, the at least one dispenser including at least one membrane, and
   the at least one dispenser is configured to introduce the at least one replenishing electrolyte from the at least one supply container into the battery by tearing the at least one membrane.

2. The battery as defined by claim 1, wherein the at least one membrane is torn by an overpressure in the at least one supply container.

3. The battery as defined by claim 1, wherein tearing the at least one membrane is controllable by a semiconductor chip.

4. The battery as defined by claim 1, wherein the at least one replenishing electrolyte is introduced from the at least one supply container into the battery by at least one capillary.

5. The battery as defined by claim 1, further comprising at least one device configured to at least one of carry away and collect gases or vapors from the battery.

6. The battery as defined by claim 5, wherein the at least one device includes at least one of an overpressure valve, a degassing conduit, and a gas collection chamber.

7. A battery having a cathode, an anode, and a separating component interposed therebetween, the battery comprising:
   a housing configured to receive the cathode, anode, and separating component of said battery and to contain electrolyte;
   at least one electrolyte contained within the housing; and
   at least one means configured to introduce at least one replenishing electrolyte into the battery, wherein:
   the at least one means includes at least one supply container for the at least one replenishing electrolyte and at least one dispenser configured to introduce the at least one replenishing electrolyte from the at least one supply container into the battery, the at least dispenser including at least one membrane, and
   the at least one dispenser is configured to introduce the at least one replenishing electrolyte from the at least one supply container into the battery by melting the at least one membrane.

8. The battery as defined by claim 7, wherein melting the at least one membrane is controllable by a semiconductor chip.

9. The battery as defined by claim 7, wherein the at least one membrane is melted by electrical energy of the battery.

10. The battery as defined by claim 8, wherein the semiconductor chip is supplied from electrical energy of the battery.

11. A battery module having a plurality of batteries, each battery of the plurality of batteries having a cathode, an anode, and a separating component interposed therebetween, the battery module comprising:
   a housing for each battery of the plurality of batteries, each housing configured to receive the cathode, anode, and separating component of a respective battery and to contain at least one electrolyte;
   at least one electrolyte contained within each of the housings;
   a device configured to at least one of carry away and collect gases or vapors from at least one battery of the plurality of batteries; and at least one means configured to introduce at least one replenishing electrolyte into at least one battery of the plurality of batteries, the at least one replenishing electrolyte separate from the at least one electrolyte, wherein:

the at least one means includes at least one supply container for the at least one replenishing electrolyte and at least one dispenser configured to introduce the at least one replenishing electrolyte from the at least one supply container into the battery, the at least dispenser including at least one membrane, and the at least one dispenser is configured to introduce the at least one replenishing electrolyte from the at least one supply container into the battery by tearing the at least one membrane.

12. The battery membrane as defined by claim 11, wherein tearing the at least one membrane is controllable by a semiconductor chip.

13. The battery module as defined by claim 11, wherein the at least one membrane is torn by an overpressure in the at least one supply container.

14. The battery module as defined by claim 12, wherein the semiconductor chip is supplied from electrical energy of the at least one battery of the plurality of batteries.

15. The battery module as defined by claim 11, wherein the at least one replenishing electrolyte is introduced from the at least one supply container into the at least one battery of the plurality of batteries by at least one capillary.

\* \* \* \* \*